(No Model.)

N. COSMAN.
KETTLE COVER.

No. 479,490. Patented July 26, 1892.

Attest
William Hall
J. E. Middleton

Inventor
Nathan Cosman
by Walter Mullen & Co.
Attys.

UNITED STATES PATENT OFFICE.

NATHAN COSMAN, OF SEATTLE, WASHINGTON, ASSIGNOR OF ONE-HALF TO
O. F. WEGENER, OF SAME PLACE.

KETTLE-COVER.

SPECIFICATION forming part of Letters Patent No. 479,490, dated July 26, 1892.

Application filed December 17, 1891. Serial No. 415,373. (No model.)

*To all whom it may concern:*

Be it known that I, NATHAN COSMAN, a citizen of the United States of America, residing at Seattle, in the county of King and State of Washington, have invented certain new and useful Improvements in Kettle-Covers, of which the following is a specification, reference being had therein to the accompanying drawings.

A disagreeable feature of cooking in the commonly-used kettles or open vessels is the overflow of the boiling liquids and the drippings from the kettle-cover upon the stove, whereby the latter gets soiled and unpleasant and noxious vapors are created. To prevent this overflow and dripping upon the stove is the object of my invention, which for this purpose is comprised of two parts—a hinged lid and a high under rim. The lid is hinged to the top part of my cover in such a manner as to make its drippings fall inside of the kettle with which the cover is used, and the under rim of the cover is so constructed, upon the theory that the liquids used in cooking are poor conductors of heat, as to create inside of the kettle next to the top edge of the kettle-wall and outside of the cover-rim a receptacle in which the liquid contents of the kettle will not come to a boiling heat—a sort of cooler-chamber in which no overflow can be generated and from which, consequently, none can run over the kettle edge, but into which the overflow from the boiling liquids in the interior of the cover-rim will flow and cool off.

Figure 1:
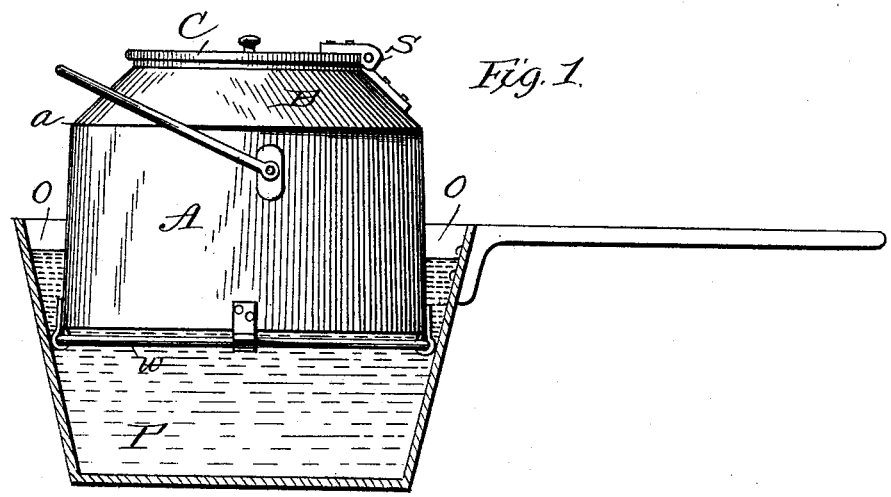
Figure 2:
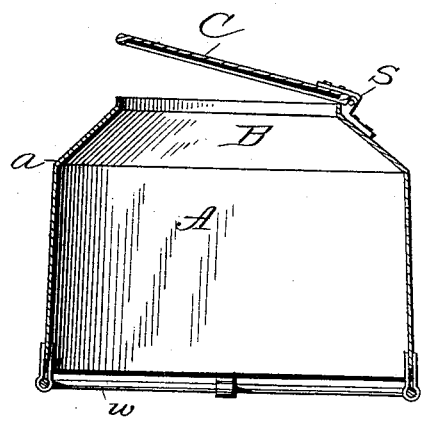

In the accompanying drawings I have shown in Figure 1 the invention applied to an ordinary form of kettle, the kettle being shown in section and the cover in side elevation. Fig. 2 is a section of the cover.

The kettle shown at P is simply representative of any form of kettle having an open upper end and walls which taper downwardly, as is the case with all open-top kettles. When the liquid contents of such kettles boil, the steam generated lifts the commonly-used cover and the overflow runs over the top of kettle upon the stove. Likewise does the steam condense on the lower side of the common cover and cause drippings thereof to fall upon the stove every time the cover is moved or lifted—an often-repeated occurrence at every process of cooking. All this is avoided by my kettle-cover, as the following description of it will show: It is made of sheet metal, preferably cylindrical in cross-section, with its walls always tapering off slightly toward the top. The cover is shown at A, and the body portion thereof extends to the line *a*, and from this line up the cover is in the shape of a truncated cone, the upper end being closed by a lid C, which is hinged to the cone-shaped portion B, as shown at S. The hinge is supplied with a shoulder, so that when open to its fullest extent every part of the lid will come vertically inside of the top edge of the kettle, thus causing all drippings from the lid to fall into the kettle. The lid must be of light weight and rest easily upon the lower part of the cover, so that any steam generated underneath it may easily lift it and escape—a circumstance of great importance in the proper working of the cooling-space hereinafter described. A bail is secured to the cover in any desirable manner, so as to provide a means of handling it. The lower portion of the cover—its under rim—must be high enough to extend about half-way into the kettle with which it is to be used, while the top of the cover should be about two inches above the top edge of the kettle. To provide the bottom edge of this under rim with a tier of narrow horizontal openings or slits in a substantial manner, a wire W is fastened to the rim with a series of clips, which hold this wire perpendicular under the edge of the rim parallel to and no more than one-eighth of an inch distant from it. The diameter of the bottom of the under rim must be such that when placed into the kettle the clips will bear closely against the kettle-walls at a horizontal line equidistant from the top and bottom of the kettle. When the cover is thus placed in the kettle, it is evident, from the fact that the kettle-walls and the cover-rim taper off in opposite directions, that a triangular space O is formed between the cover-rim and the upper part of the kettle-wall. This space is open on top and exposed on its wider top surface to the atmosphere, while at its narrow bottom it is in communication with the main part of the kettle through the slit-like openings above the wire W and through the narrow spaces between the clips bounded by the wire and the kettle-walls. Through these different openings any liquid poured into the kettle will, seeking its level, readily enter into the triangular space O; but when the contents of the kettle become heated these openings are too small to admit sufficient heat into the triangular space to overcome the cooling effect of the atmosphere on the top surface, and I have found in practice that any liquid in this outside space or cooler-chamber O will remain comparatively cool, never approaching boiling heat, no matter how much the liquids inside of the cover-rim may boil. Consequently there can be no overflow from the triangular space over the kettle-wall onto the stove. The only overflow produced must come from the interior of the cover-rim, over whose top edge it will run down on the outside of the cover-rim and drop cooled by the atmosphere into the cooler-chamber O, whence it must travel back into the main part of the kettle before it can boil again. Practice has likewise proven that when the kettle contents are heated the expanding wire pushes the clips so tight against the kettle-walls as to hold them there firmly enough to prevent the rising steam from lifting the cover.

The conditions of the successful working of the cooler are that the cover-lid be constructed, as described, so as to readily let off the steam and overflow, as the latter would otherwise force its way out through the cooler-chamber O. Furthermore, the openings at the bottom of the triangular space or cooler-chamber must be as small as is practicable without impeding the quick flow of the kettle contents into the cooler-chamber, and vice versa, and, lastly, the cover-rim must reach deep enough into the kettle and taper off enough upward to make the triangular cooler-chamber sufficiently capacious to contain more water than can be quickly heated through the small openings below and to give its surface ample width for enabling the atmosphere to exercise its cooling influence. The cooler-chamber is likewise useful by showing at any time during the process of cooking how high or low the liquids stand in the kettle, and any additional liquid may be poured into the kettle by way of the cooler-chamber both without the lid having to be opened or the cover to be removed, as must be done when the common kettle-covers are used.

I claim as my invention—

1. A kettle-cover having a lower bearing or bearings to fit against the interior of the kettle-walls, with openings around the lower part of the cover adjacent to said bearings, the sides of the cover inclining inwardly and upwardly from the lower bearings, and a top for the cover, substantially as described.

2. A kettle-cover having a series of clips on its lower edge for supporting the same and a wire supported by said clips, substantially as described, and for the purpose set forth.

3. A kettle-cover having clips secured to its lower edge and a pivoted top, said cover being inclined from its upper to its lower part, substantially as described.

4. A kettle-cover having the supporting means at its lower edge to hold the same slightly from the sides of the kettle and having the truncated upper portion with the top therefor, substantially as described.

5. In combination, a kettle having flaring sides, the cover of less diameter adapted to fit therein and having the bearings at its lower edge to fit against the inner walls of the kettle to hold the cover away from the walls and to provide a space between, and the top for the cover, substantially as described.

6. In combination, the kettle, the cover of less diameter adapted to fit within the kettle and to be supported at its lower edge against the inner walls thereof to form a cooler-chamber O between it and the kettle and having about its lower edge narrow openings connecting the chamber O with the interior of the kettle, and a top for the cover, substantially as described.

In testimony whereof I affix my signature in presence of two witnesses.

NATHAN COSMAN.

Witnesses:
W. D. NEWTON,
M. A. NEWTON.